United States Patent
Chang et al.

(10) Patent No.: US 8,641,920 B2
(45) Date of Patent: Feb. 4, 2014

(54) POLISHING COMPOSITION FOR PLANARIZING METAL LAYER

(75) Inventors: Song-Yuan Chang, Zhongli (TW); Ming-Che Ho, Zhongli (TW); Ming-hui Lu, Zhongli (TW)

(73) Assignee: UWiZ Technology Co., Ltd., Zhongli (TW)

( * ) Notice: Subject to any disclaimer, the term of this patent is extended or adjusted under 35 U.S.C. 154(b) by 300 days.

(21) Appl. No.: 12/482,983

(22) Filed: Jun. 11, 2009

(65) Prior Publication Data
US 2010/0163784 A1 Jul. 1, 2010

(30) Foreign Application Priority Data
Dec. 30, 2008 (TW) ................ 97151353 A

(51) Int. Cl.
*C09K 13/00* (2006.01)
(52) U.S. Cl.
USPC ............ 252/79.1; 438/691; 438/692; 51/308
(58) Field of Classification Search
None
See application file for complete search history.

(56) References Cited

U.S. PATENT DOCUMENTS

| 7,338,908 | B1 * | 3/2008 | Koos et al. ............ 438/745 |
| 2005/0029491 | A1 * | 2/2005 | Liu ............... 252/79.1 |

OTHER PUBLICATIONS

Wang et al, Preperation of submicron spherical particles of silica by the water-in-oil microemulsion method, Dec. 1993, Elsevier B.V., colloids and surfaces A: Physicochemical and engineering aspects vol. 81, p. 177-180.*
Doering et al, handbook of semiconductor manufacturing technology, second edition, Jul. 2007, CRC Press, p. 17-16, 17-17.*

* cited by examiner

*Primary Examiner* — Binh X Tran
*Assistant Examiner* — David Cathey, Jr.
(74) *Attorney, Agent, or Firm* — Jackson IPG PLLC

(57) ABSTRACT

A polishing composition of the present invention at least comprises about 750 ppm to less than 5000 ppm by weight of abrasive particles, hydrogen peroxide, an accelerator, a dual-corrosion inhibitor and water, wherein the dual-corrosion inhibitor contains a first and a second corrosion inhibitor. The dual-corrosion inhibitor is applied to the planarization of metal layers so as to maintain a high removal rate of metal layers as well as suppress etching of the metal, thus capable of reducing polishing defects such as dishing, erosion and the like.

13 Claims, 1 Drawing Sheet

POLISHING COMPOSITION FOR PLANARIZING METAL LAYER

BACKGROUND OF THE INVENTION (a) Field of the Invention

The present invention relates to a polishing composition for planarizing a metal layer. Its object is to provide a polishing composition for use in chemical mechanical polishing, thus capable of improving the planarization effect of a work piece.

(b) Description of the Prior Art

With the critical dimension of an electronic component becoming more and more compact and the wiring layer number thereof rapidly increasing, the RC time delay significantly affects the operation speed of the entire circuits. In order to improve the problems of the time delay and the reliability of electron migration due to the reduction in metal line width, copper conductor material with low resistivity and high resistance to damage by electron migration is selected to replace aluminum alloys. However, it needs to employ another damascene process in forming copper conductors because copper metal is difficult to be etched.

Damascene processes are different from traditional metallization processes, in which metallic patterns are initially defined, followed by filling trenches with dielectric layers. In the damascene process, a conductive line trench is first etched in a flat dielectric layer, filling a metal layer therein, and finally removing excess metal to obtain a flat structure with metal inlayed in the dielectric layer. Damascene processes have the following advantages in comparison with traditional metallization processes: (1) the surface of a substrate is always kept flat; (2) the drawback that dielectric material is difficult to be filled into the spacing between metallic conductors in traditional processes can be eliminated; (3) the difficulty in etching metallic material, especially in etching copper metal could be solved.

Moreover, in order to overcome the drawback that the necessity of separately fabricating a contact window structure and a conductor pattern makes the fabrication procedures of a traditional interconnection process extremely complicated, currently, a dual damascene process is further developed. In the dual damascene process, a line dielectric and a via dielectric are respectively etched off by two times of selective etching, completing the barrier layers of the metal layer and of the plug at a time, then filling conductive metal into the vias and interconnection trenches at a time, so as to simplify the fabrication procedures. In recent years, copper metal with low resistivity and high resistance to electron migration has been gradually used as the material of metal interconnects instead of aluminum metal in the prior process technology to meet the requirement for miniaturizing the components and increasing the operation speed thereof. Copper damascene interconnection technology not only can achieve the miniaturization of interconnects and the reduction of RC time delay, but also can solve the difficulty in etching metallic copper. Therefore, it has become the main trend of the development of multiple interconnections today.

Regardless of in a single damascene or in a dual damascene copper process, after the completion of the copper metal filling, it needs to perform a planarization process for removing excess metal on the dielectric layer. Currently, this purpose is usually achieved by a chemical mechanical polishing process. However, in metal chemical mechanical polishing, polishing defects such as dishing, erosion and the like still often occur on the surface of a metal layer.

Dishing and erosion are strongly associated with the removal rate and RR/DER ratio. A lower removal rate can ensure a low removal rate on a pattern recess to effectively suppress dishing defects, but in view of the throughput of the unit, the removal rate must be maintained within an acceptable range. Furthermore, the polishing uniformity affects the planarity to a certain extent. More polishing time is required for completely removing copper with poorer uniformity, thus causing more serious dishing and erosion problems.

To give consideration to both the throughput of the unit and the suppression of dishing and erosion, a copper chemical mechanical polishing process is often divided into two stages. In the first stage, most copper is removed at a higher removal rate to increase the throughput of the unit. In the second stage, a small amount of the remaining copper is polished off at a lower removal rate to prevent the copper in the trenches from excessive erosion. In general, a two-stage copper polishing process needs to change polishing compositions of different formulations to satisfy the requirements in the various stages for polishing copper. However, the changing of polishing compositions is disadvantageous to process simplification as well as increases the waste.

A polishing composition disclosed in US patent 2008/0254629 comprises an amino acid, about 5 ppm to less than 700 ppm abrasive particulate material by weight, a triazole compound and water, wherein the ratio of copper rate of removal relative to the stop layer rate of removal, i.e., the selectivity, is greater than 50:1. US Patent Publication No. 2004/0020135 disclosed a copper polishing composition comprising silica, an oxidant, an amino acid, a triazole compound and water. Furthermore, U.S. Pat. No. 6,440,186 disclosed a polishing composition containing: an abrasive, a protective film forming agent and hydrogen peroxide, wherein the abrasive has a particle size from 50 to 120 nm and is in an amount of from 0.5 to 5 wt % (percent by weight) based on the total weight of the composition. Moreover, U.S. Pat. No. 6,679,929 disclosed a polishing composition comprising an abrasive, an aliphatic carboxylic acid having at least 10 carbon atoms, a basic compound selected from ammonium hydroxide etc., a polishing accelerating compound, an anticorrosive, hydrogen peroxide and water. However, the above patents do not disclose that a polishing composition employing a dual-inhibitor could decelerate the metal etching rate under the condition of maintaining a high removal rate and meanwhile was suited to the first and second stages for polishing copper metal.

SUMMARY OF THE INVENTION

A primary objective of the present invention is to provide a polishing composition for planarizing a metal layer, thus capable of improving the planarization effect of a work piece.

Another objective of the present invention is to provide a polishing composition suitable for two-stage metal polishing.

To achieve the above objectives, a polishing composition of the present invention at least comprises about 750 ppm to less than 5000 ppm by weight of abrasive particles, hydrogen peroxide, an accelerator, a dual-corrosion inhibitor and water, wherein the dual-corrosion inhibitor contains a first and a second corrosion inhibitor. The dual-corrosion inhibitor is applied to the planarization of metal layers so as to maintain a high removal rate of metal layers as well as suppress etching of the metal, thus capable of reducing polishing defects such as dishing, erosion and the like.

DETAILED DESCRIPTION OF THE PREFERRED EMBODIMENTS

Figure 1:
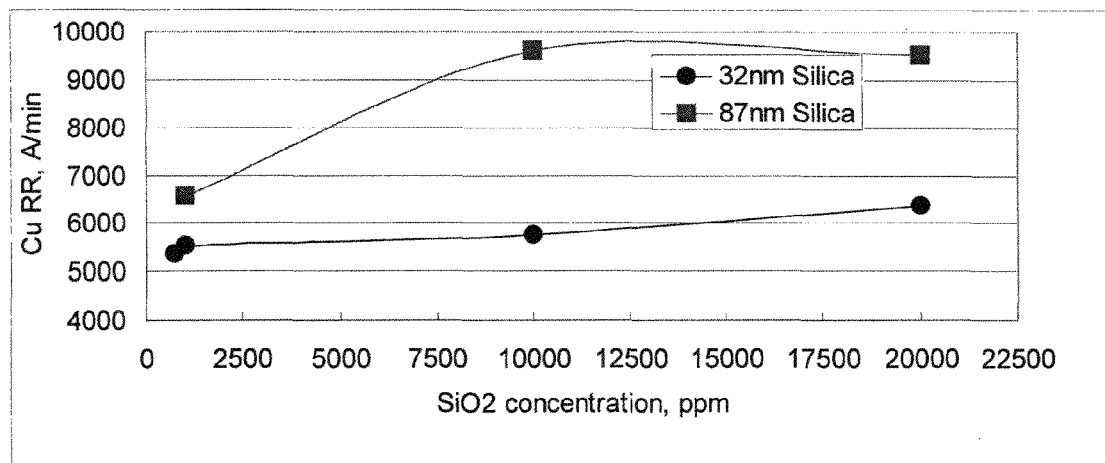
FIG. 1 shows the relationship between the concentration of abrasive particles and the removal rate.

The features of the present invention may be understood clearly with reference to the following detailed description of preferred embodiments and the accompanying drawings.

The present invention provides a polishing composition for planarizing a metal layer. The polishing composition at least comprises: about 750 ppm to less than 5000 ppm by weight of abrasive particles, hydrogen peroxide, an accelerator, a dual-corrosion inhibitor and water, wherein the dual-corrosion inhibitor contains a first and a second corrosion inhibitor. The polishing composition is used in planarizing a metal layer, which can form a protective film on the surface of a work piece to prevent the work piece from excessive corrosion during chemical mechanical polishing and can enhance the anticorrosion ability of the work piece.

The abrasive particles are present in about 750 ppm to less than 5000 ppm by weight, preferably 1000 ppm to less than 3000 ppm by weight. The diameter of the abrasive particles is less than 90 nm (preferably less than 50 nm). Examples of the abrasive particles include, but not limited to, fumed silica; colloidal silica formed by hydrolysis of sodium silicate or potassium silicate, or hydrolysis and condensation of silane; precipitated or fumed aluminum oxide; precipitated or fumed titanium dioxide; polymeric materials; and hybrids of metal oxides and polymeric materials. Colloidal silica is preferable. If the amount of the abrasive particles is too small, it is disadvantageous to mechanical polishing and the desired removal rate cannot be achieved. On the other hand, too much amount of abrasive particles would accelerate the effect of mechanical polishing and increase the removal rate of barrier layers and insulation oxide layers, thus easy to cause polishing defects such as erosion on the surface.

The oxidant is present in an amount of 0.25 to 5 wt % based on the total weight of the composition. Examples of the accelerator in the polishing composition include, but not limited to, citric acid, oxalic acid, tartaric acid, histidine, alanine, glycine and ammonium salts, sodium salts, potassium salts or lithium salts thereof. The accelerator is used to promote the dissolution of metal to be polished, such as copper. When the added amount of the accelerator in the polishing composition increases, it facilitates to increase the removal rate of metal layers. This is suitable for metal layer polishing in the first stage. However, the increased added amount of the accelerator in the polishing composition also increases the static etching rate and is disadvantageous to fine polishing in the second stage. In one embodiment, the accelerator is present in an amount of 0.01 to 5 wt % based on the total weight of the composition.

The dual-corrosion inhibitor effectively suppresses the static etching rate under the condition of high removal rates, suitable for the polishing processes in the first and second stages. The first corrosion inhibitor of the present invention is selected from 1-H-benzotriazole, N-acyl sarcosine, alkyl sulfate or alkyl sulfonate. The second corrosion inhibitor is selected from 1,2,3-triazole, 1,2,4-triazole, tolytriazole, 5-amino tertraazole, 3-amino-1,2,4-triazole, 4-amino-4H-1,2,4-triazole, 3-nitro-1,2,4-triazole, 3mercapto-1,2,4-triazole, 1H-1,2,3-triazole-1-ethanol, benzimidazole, imidazole, pyrrole, pyrroline, oxazole, isoxazole, indazole or indolizine. The dual-corrosion inhibitor is present in an amount of 0.001 to 1 wt % based on the total weight of the composition.

The features and functions of the present invention are further illustrated by the following particular examples, but they are not to be construed to limit the scope of the present invention.

Examples 1 to 5

As listed in Table 1, the tests were conducted using a silica sol abrasive, glycine, hydrogen peroxide, 1-H-benzotriazole (BTA), 1,2,4-triazole and water as the samples of polishing slurry compositions.

TABLE 1

| | oxidant (hydrogen peroxide) (wt %) | accelerator (glycine) (wt %) | 1,2,4-triazole (ppm) | BTA (ppm) | 32 nm abrasive particles (silica sol) (ppm) | pH |
|---|---|---|---|---|---|---|
| Example 1 | 0.8 | 0.8 | 350 | 0 | 2000 | 7.3 |
| Example 2 | 0.8 | 0.8 | 350 | 15 | 2000 | 7.3 |
| Example 3 | 0.8 | 0.8 | 700 | 15 | 2000 | 7.3 |
| Example 4 | 0.8 | 0.8 | 1000 | 20 | 2000 | 7.3 |
| Example 5 | 0.8 | 1.2 | 1000 | 30 | 2000 | 7.3 |

The polishing tests were conducted according to the following conditions.

polisher: Mirra polisher (Applied Materials)

wafer type: 8" 15 KA copper blanket wafer (Ramco Co)

down force: 3, 1.5 and 0 psi platen speed: 93 rpm carrier speed: 87 rpm polishing pad: IC 1010 (Rohm Hass Electronic Materials)

slurry flow rate: 150 ml/min

The thicknesses of the copper film on the wafer before and after polishing were measured using a 4-point probe to calculate the rate. The results are shown in Table 2.

TABLE 2

| | Cu RR@3 psi (Å/min) | Cu RR@1.5 psi (Å/min) | DER (Å/min) | RR (3 psi)/DER |
|---|---|---|---|---|
| Example 1 | 9618 | 5005 | 411 | 23.40 |
| Example 2 | 8761 | 4714 | 253 | 34.63 |
| Example 3 | 6234 | 3220 | 116 | 53.74 |
| Example 4 | 5350 | 2560 | 80 | 66.88 |
| Example 5 | 5859 | 3708 | 81 | 72.33 |

The RR refers to a removal rate, and the DER refers to a dynamic etching rate, i.e. a removal rate at 0 psi.

As can be seen from the results in Table 2, the effect of the dual-corrosion inhibitor can be explained by Examples 1 and 2. In Example 2, the dual-corrosion inhibitor is used and the result shows a higher RR/DER ratio. BTA in the dual-corrosion inhibitor imparts a coarse conditioning function to the removal mechanism of polishing, and 1,2,4-triazole imparts a fine conditioning function thereto. In Examples 4 and 5, the more the amount of the accelerator is, the higher the removal rate will become, but consequently the dynamic etching rate also rises. The inhibitor needs to be adjusted for the purpose of control. Therefore, a most ideal polishing composition must provide the balance between the removal rate and the RR/DER ratio.

Examples 5 to 6

As listed in Table 3, the tests were conducted using a silica sol abrasive, glycine, hydrogen peroxide, 1-H-benzotriazole (BTA), 1,2,4-triazole and water as the samples of polishing slurry compositions.

TABLE 3

|  | oxidant (hydrogen peroxide) (wt %) | accelerator (glycine) (wt %) | 1,2,4-triazole (ppm) | BTA (ppm) | 32 nm abrasive particles (silica sol) (ppm) | pH |
|---|---|---|---|---|---|---|
| Example 5 | 0.8 | 1.2 | 1000 | 30 | 2000 | 7.3 |
| Example 6 | 0.8 | 0.8 | 750 | 25 | 1000 | 7.35 |

The polishing tests were conducted according to the following condition. The results are recorded in Table 4.
wafer type: MIT 854 patterned wafer (Ramco Co)
down force: 3 psi
platen speed: 93 rpm
carrier speed: 87 rpm
slurry flow rate: 150 ml/min The dishing degree at each measurement site after polishing was measured with a HRP220 profiler (KLA-Tenco). 100×100 micron copper wires were used as measuring points in the measurement. The results determined at the grains in the central, middle and edge regions of the wafer are recorded in Table 4.

TABLE 4

| polishing time (Sec) | dishing (Example 5) | | | dishing (Example 6) | | |
|---|---|---|---|---|---|---|
|  | die in the central region (Å) | die in the middle region (Å) | die in the edge region (Å) | die in the central region (Å) | die in the middle region (Å) | die in the edge region (Å) |
| 92 | — | — | — | 80 | 80 | 10 |
| 95 | 80 | 0 | 0 | — | — | — |
| 128 | 600 | 800 | 700 | — | — | — |
| 133 | — | — | — | 700 | 500 | 300 |

These dishing values were obtained at the time when the wafers were 30% over-polished subsequently to the polishing until the end point. As can be seen from the results in Table 4, all these values are less than 800 Angstrom (Å). For wafer manufacturing processes, these surface topographies are highly practical. The compositions developed in the present invention have excellent functions and are proved useful in CMP processes of wafer manufacturing processes.

Examples 7 to 13

As listed in Table 5, the tests were conducted using a silica sol abrasive, glycine, hydrogen peroxide, benzotriazole, 1,2,4-triazole and water as the samples of polishing compositions.

TABLE 5

|  | oxidant (hydrogen peroxide) (wt %) | accelerator (glycine) (wt %) | 1,2,4-triazole (ppm) | benzotriazole (ppm) | 32 nm abrasive particles (silica sol) (ppm) | 87 nm abrasive particles (silica sol) (ppm) | pH |
|---|---|---|---|---|---|---|---|
| Example 7 | 0.8 | 0.8 | 900 | 25 | 750 | — | 7.33 |
| Example 8 | 0.8 | 0.8 | 900 | 25 | 1000 | — | 7.35 |
| Example 9 | 0.8 | 0.8 | 900 | 25 | 10000 | — | 7.35 |
| Example 10 | 0.8 | 0.8 | 900 | 25 | 20000 | — | 7.4 |
| Example 11 | 0.8 | 0.8 | 900 | 25 | — | 1000 | 7.35 |
| Example 12 | 0.8 | 0.8 | 900 | 25 | — | 10000 | 7.35 |
| Example 13 | 0.8 | 0.8 | 900 | 25 | — | 20000 | 7.4 |

In the examples shown in Table 5, the polishing tests were performed on a Mirra polisher (Applied Materials) according to the conditions of Examples 1 to 5. The polished wafers were Cu, Ta and TaN blanket wafers. The results are shown in Table 6 and FIG. 1.

TABLE 6

|  | Cu RR (Å/min) | Ta RR (Å/min) | TaN RR (Å/min) | Cu DER (Å/min) |
|---|---|---|---|---|
| Example 7 | 5366 | 4 | 4 | 73 |
| Example 8 | 5530 | 5 | 6 | 85 |
| Example 9 | 5755 | 8 | 10 | 126 |
| Example 10 | 6368 | 12 | 15 | 164 |
| Example 11 | 6561 | — | — | 102 |
| Example 12 | 9602 | 23 | 54 | 129 |
| Example 13 | 9529 | 14 | 21 | 150 |

As can be seen from the results in Table 6, the higher the concentration of abrasive particles, the greater the removal rate of copper. This phenomenon is more obvious for abrasive particles having greater diameters. When the concentration of abrasive particles reaches a certain level, the removal rate reaches a saturation value and does not increase further. Besides, the removal rate using larger abrasive particles reaches a saturation value faster than the removal rate using smaller abrasive particles. This result shows that the increase in removal rate by adjusting the concentration of silica should be limited. No matter whether silica with larger or smaller particle diameters is used, there is no difference in this aspect. Due to the limitation of the concentration of silica in increasing the removal rate, silica can be properly used in an effective concentration range in applications.

Examples 8 and 11

As listed in Table 7, the tests in Examples 8 and 11 were performed at different pressures.

TABLE 7

|  | oxidant (hydrogen peroxide) (wt %) | accelerator (glycine) (wt %) | 1,2,4-triazole (ppm) | benzotriazole (ppm) | 32 nm abrasive particles (silica sol) (ppm) | 87 nm abrasive particles (silica sol) (ppm) | pH |
|---|---|---|---|---|---|---|---|
| Example 8 | 0.8 | 0.8 | 900 | 25 | 1000 | — | 7.35 |
| Example 11 | 0.8 | 0.8 | 900 | 25 | — | 1000 | 7.35 |

In the examples shown in Table 7, the polishing tests were performed on a Mirra polisher (Applied Materials) according to the conditions of Examples 1 to 5. The polishing tests were performed at down forces (Df) of 1.5, 2 and 3 psi, respectively, and were measured using a 4-point probe. The results are shown in Table 8 and FIG. 2.

TABLE 8

| Example 8 | | Example 11 | |
|---|---|---|---|
| Df. psi | Cu RR (Å/min) | Df. psi | Cu RR (Å/min) |
| 1.5 | 4026 | 1.5 | 2791 |
| 2 | 4977 | 2 | 4955 |
| 3 | 6653 | 3 | 8183 |

Figure 2:
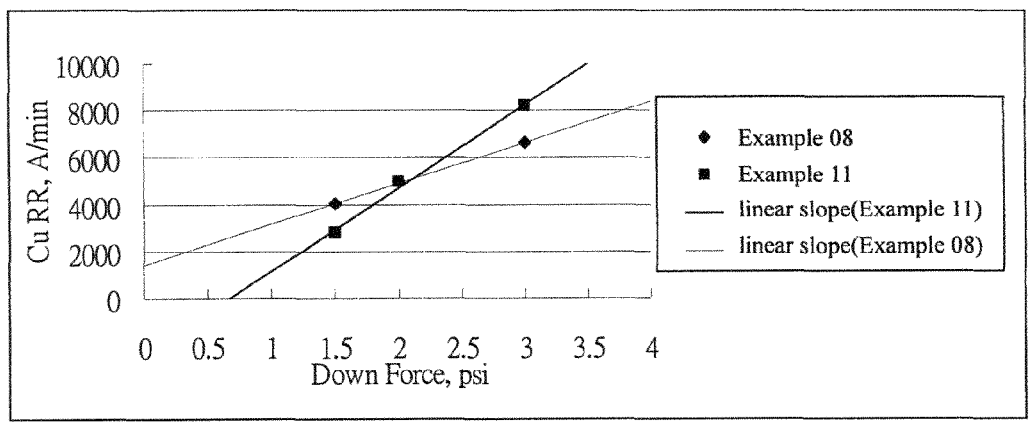
FIG. 2 shows abrasive particles with a larger diameter have a greater linear slope.

As can be seen from the results in Table 8, abrasive particles with a large diameter (87 nm) exhibits a higher copper removal rate at a down force of 3 psi, and abrasive particles with a small diameter (32 nm) exhibits a higher copper removal rate at a down force of 1.5 psi. FIG. 2 shows abrasive particles with a larger diameter have a greater linear slope. However, in advanced Cu CMP processes, a high down force comes with a drawback, i.e. the cause of damage to and defects in low k materials. Therefore, the use of a down force greater than 2.5 psi is avoided in most chemical mechanical polishing processes as possible.

Similarly, as listed in Table 7, the patterned wafers (MIT 854 type) in Examples 8 and 11 were polished under the same parameter conditions. The patterned wafer was 30% over-polished after it was polished to the endpoint. 100×100 micron copper wires were used as measuring points in the measurement. The results of dishing determined at the grains in the central, middle and edge regions of the wafer are recorded in Table 9.

TABLE 9

| | Example 8 | | | Example 11 | | |
|---|---|---|---|---|---|---|
| polishing time (Sec) | die in the central region (Å) | die in the middle region (Å) | die in the edge region (Å) | die in the central region (Å) | die in the middle region (Å) | die in the edge region (Å) |
| 120 | — | — | — | 1600 | 1500 | 1600 |
| 144 | 800 | 875 | 845 | — | — | — |

These results show abrasive particles with a larger diameter can provide a high removal rate (a shorter polishing time), but consequently the polishing defects such as dishing, etc. would get worse. Hence, it is advantageous to use abrasive particles with smaller diameters in chemical mechanical polishing processes.

Examples 14 to 17

As listed in Table 10, the tests were conducted using a silica sol abrasive, glycine, hydrogen peroxide, benzotriazole, 1,2,4-triazole and water as the samples of polishing compositions.

TABLE 10

|  | oxidant (hydrogen peroxide) (wt %) | accelerator (glycine) (wt %) | 1,2,4-triazole (ppm) | benzo-triazole (ppm) | 32 nm abrasive particles (silica sol) (ppm) | pH |
|---|---|---|---|---|---|---|
| Example 14 | 0.8 | 0.7 | 800 | 25 | 1000 | 7.35 |
| Example 15 | 0.8 | 0.7 | 800 | 25 | 5000 | 7.35 |
| Example 16 | 0.8 | 0.7 | 800 | 25 | 10500 | 7.4 |
| Example 17 | 0.8 | 0.7 | 600 | 25 | 5000 | 7.35 |

Figure 3:
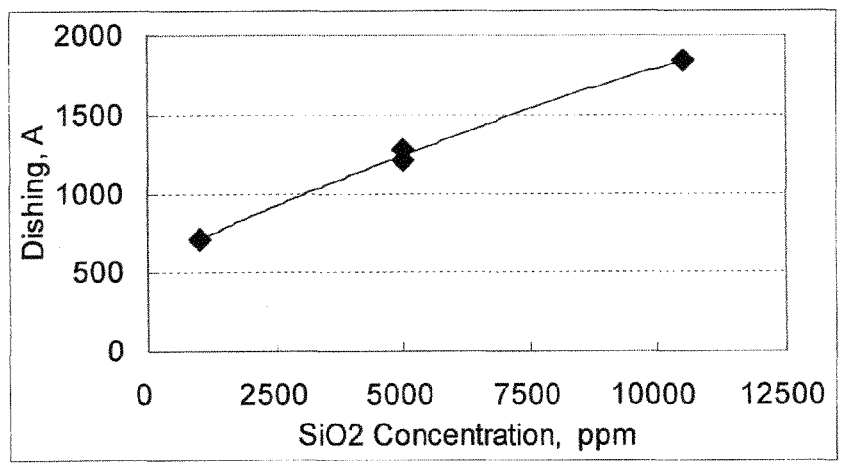
FIG. 3 shows the relationship between the concentration of abrasive particles and the dishing.

In the examples shown in Table 10, the blanket Cu wafers and patterned wafers (MIT 854 type) were polished on a Mirra polisher (Applied Materials) The results of the removal rate and the average dishing values at each measurement site of the grains in the central, middle and edge regions of the wafer after polishing tests are recorded in Table 11 and FIG. 3.

TABLE 11

|  | silica sol (ppm) | Cu RR@3 psi (Å/min) | average dishing (Å) |
|---|---|---|---|
| Example 14 | 1000 | 6468 | 710 |
| Example 15 | 5000 | 7312 | 1277 |
| Example 16 | 10500 | 7659 | 1840 |
| Example 17 | 5000 | 7307 | 1213 |

Table 11 shows the removal rate slowly rises as the concentration of abrasive particles increases, but the increase amount is very small. For example, compared with Examples 14 and 16, the removal rate merely increases by 18%, but the concentration must be increased by more than 10 times to achieve this. In FIG. 3, it is obvious that the concentration of abrasive particles does indeed affect dishing, namely, the more the abrasive particles (the higher the concentration) the worse the polishing dishing, etc. In order to ensure that the dishing is controlled to an acceptable level, the concentration of abrasive particles must be limited within a certain range.

The technical contents and features of the present invention are disclosed above. However, anyone familiar with the technique could possibly make modify or change the details in accordance with the present invention without departing from the spirit of the invention. The protection scope of the present invention shall not be limited to what embodiment discloses, and should include various modification and changes that are made without departing from the spirit of the present invention, and should be covered by the claims mentioned below.

What is claimed is:

1. A polishing composition for planarizing a metal layer consisting essentially of:
   about 750 ppm to less than 5000 ppm by weight of abrasive particles;
   hydrogen peroxide,
   wherein the hydrogen peroxide is present in an amount of 0.8 wt % based on a total weight of the composition;
   an accelerator;
   a dual-corrosion inhibitor that reduces a static etching rate of the composition under a high removal rate and contains a first and a second corrosion inhibitor,
   wherein the first corrosion inhibitor is selected from 1-H-benzotriazole, an N-acyl sarcosine, an alkyl sulfate or an alkyl sulfonate, and wherein the dual-corrosion inhibitor is present in an amount of 0.001 to 1 wt % based on the total weight of the composition;
   and water,
   wherein the metal layer comprises copper and wherein the composition has a pH of 7.3 to 7.4.

2. The polishing composition for planarizing a metal layer as claimed in claim 1,
   wherein the abrasive particles are present in 1000 ppm to less than 3000 ppm by weight.

3. The polishing composition for planarizing a metal layer as claimed in claim 1,
   wherein the diameter of the abrasive particles is less than 90 nm.

4. The polishing composition for planarizing a metal layer as claimed in claim 1,
   wherein the diameter of the abrasive particles is less than 50 nm.

5. The polishing composition for planarizing a metal layer as claimed in claim 1,
   wherein the abrasive particle is selected from the group consisting of fumed silica, colloidal silica formed by hydrolysis of sodium silicate or potassium silicate, or hydrolysis and condensation of silane, precipitated or fumed aluminum oxide, precipitated or fumed titanium dioxide, polymeric materials, and hybrids of metal oxides and polymeric materials.

6. The polishing composition for planarizing a metal layer as claimed in claim 1,
   wherein the abrasive particle is a colloidal silica.

7. The polishing composition for planarizing a metal layer as claimed in claim 1,
   wherein the accelerator is selected from the group consisting of citric acid, oxalic acid, tartaric acid, histidine, alanine, glycine and ammonium salts, sodium salts, potassium salts or lithium salts.

8. The polishing composition for planarizing a metal layer as claimed in claim 1,
   wherein the accelerator is present in an amount of 0.01 to 5 wt % based on the total weight of the composition.

9. The polishing composition for planarizing a metal layer as claimed in claim 1,
   wherein the second corrosion inhibitor is selected from the group consisting of 1,2,3-triazole, 1,2,4-triazole, tolytriazole, 5-amino tertraazole, 3-amino-1,2,4-triazole, 4-amino-4H-1,2,4-triazole, 3-nitro-1,2,4-triazole, 3-mercapto-1,2,4-triazole, 1H-1,2,3-triazole-1-ethanol, benzimidazole, imidazole, pyrrole, pyrroline, oxazole, isoxazole, indazole or indolizine.

10. The polishing composition for planarizing a metal layer as claimed in claim 1,
    wherein the first and the second corrosion inhibitors are selected so that the polishing composition serves as a copper slurry for both a first rough polishing step and a second fine polishing step of a two-stage copper removal CMP process,
    wherein a first copper removal rate in the first rough polishing rate step is higher than a second copper removal rate in the second fine polishing step.

11. A polishing composition for planarizing a metal layer consisting of:
    750 ppm to less than 5000 ppm by weight of abrasive particles;
    hydrogen peroxide;
    wherein the hydrogen peroxide is present in an amount of 0.8 wt % based on a total weight of the composition;
    an accelerator;
    a dual-corrosion inhibitor that reduces a static etching rate of the composition under a high removal rate and contains a first and a second corrosion inhibitor;
    wherein the first corrosion inhibitor is selected from 1-H-benzotriazole, an N-acyl sarcosine, an alkyl sulfate or an alkyl sulfonate, and
    wherein the dual-corrosion inhibitor is present in an amount of 0.001 to 1 wt % based on the total weight of the composition;
    and water and
    wherein the composition has a pH of 7.3 to 7.4.

12. The polishing composition for planarizing a metal layer of claim 11,
    wherein the accelerator is present in an amount of 0.01 to 5 wt % based on the total weight of the composition.

13. The polishing composition for planarizing a metal layer of claim 11,
    wherein the first and the second corrosion inhibitors are selected so that the polishing composition forms a slurry configured for both a first rough polishing step and a second fine polishing step of a two-stage removal CMP process,
    wherein a first removal rate in the first rough polishing rate step is higher than a second removal rate in the second fine polishing step.

* * * * *